Oct. 22, 1935.
C. H. PATTEN
2,018,467
SHAFT SUSPENSION
Filed March 17, 1932
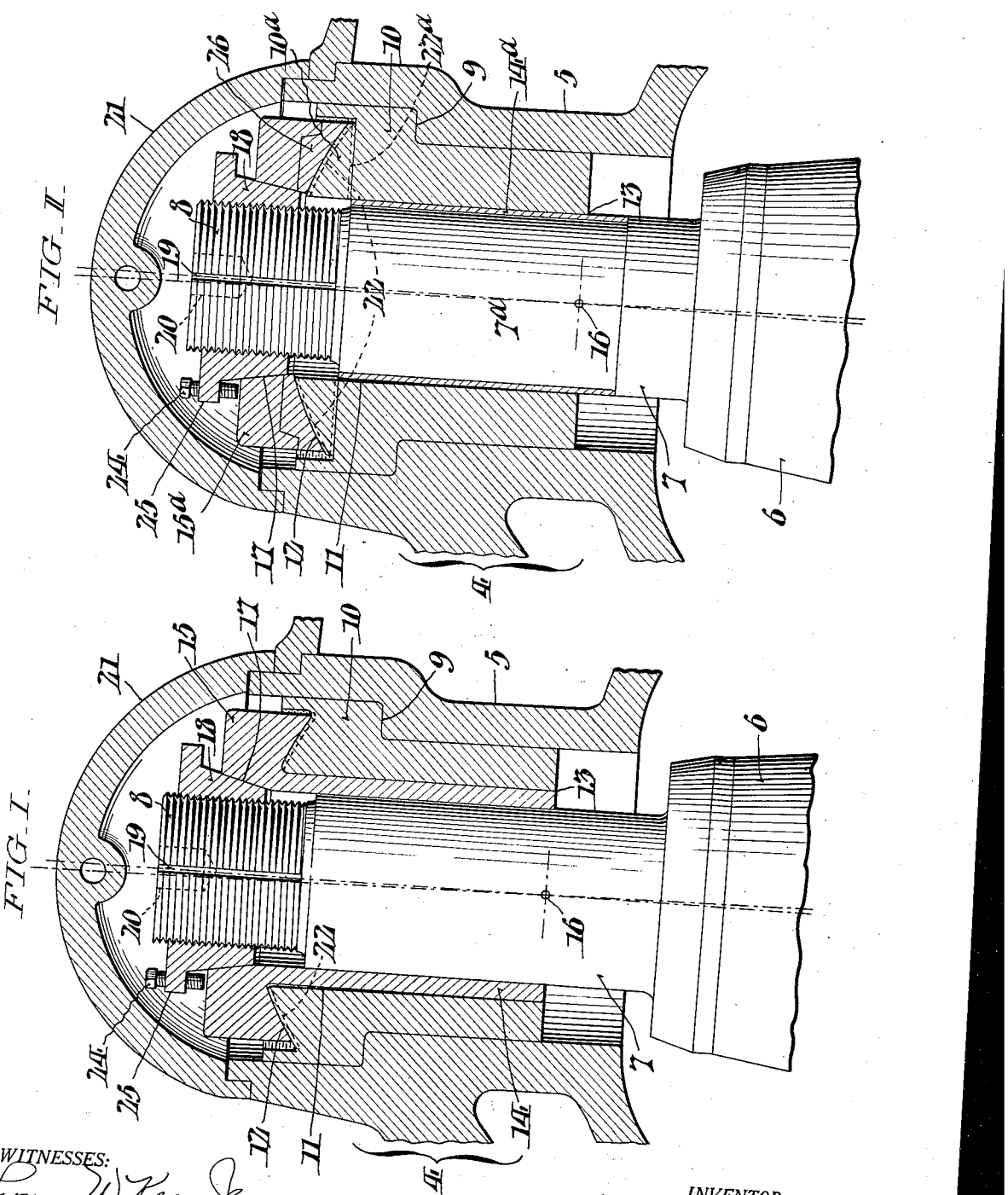
INVENTOR:
Charles H. Patten,
BY
ATTORNEYS.

Patented Oct. 22, 1935

2,018,467

UNITED STATES PATENT OFFICE 2,018,467

SHAFT SUSPENSION

Charles H. Patten, Allentown, Pa., assignor to Traylor Engineering & Manufacturing Company, Allentown, Pa., a corporation of Delaware Application March 17, 1932, Serial No. 599,584

5 Claims. (Cl. 308—142)

This invention relates to shaft suspension, and is especially adapted for suspending the shafts and associated parts of gyratory crushers or the like, that are subject to heavy downthrusts. A principal object of the invention is to afford strength to sustain such heavy thrusts without creeping and without failure of any of the parts that must carry the stress. The invention is an improvement on the shaft suspension of my U. S. Patent No. 1,329,848, February 3, 1920.

In the drawing, Fig. I shows a vertical axial section through a gyratory crusher suspension embodying my present invention in one preferred form.

Fig. II is a similar view showing a somewhat different construction.

Fig. I shows a portion of the crusher frame or spider 4 including the hub 5, and also part of the crushing head 6 on the gyratory shaft 7, whose upper end is reduced and screw-threaded at 8. The internal bore of the hub 5 is enlarged at its upper portion, thus affording a shoulder 9 to seat and support a bearing device here consisting of a bushing 10, which may have a tight fit in the hub bore. The bushing 10 has an internal journal surface 11 for taking the side thrust of the gyrating shaft 7, and a supporting upper supporting portion with bearing surface portion 12 on top for carrying the weight and downthrust of the shaft. The internal surface 11 is taper-bored in correspondence with the inclination of the shaft 7, so that the shaft may freely gyrate as well as rotate. The lower end 13 of the bore 11 is a fit on the external journal surface of the shaft 7, which is formed by a sleeve 14 that has a sliding fit on the shaft proper. For engaging with the support-bearing surface 12, there is a bearing collar 15 associated with the shaft 7, and in the present instance integral with its sleeve 14, so as to be in effect an external flange on the sleeve. The coacting surfaces of the parts 10 and 15 at 12 are preferably machined spherical, to a center 16 in the shaft axis and in the plane of the lower end 13 of the journal bore 11, which is the fulcrum point for shaft 7 and crushing head 6. The upper end of the sleeve 14 (inside the collar 15) is taper bored at 17, and a contractile conical nut 18, correspondingly tapered, is screwed on the shaft end 8 and into the sleeve taper 17, which it fits tightly. The nut 18 may be similar to that shown in my prior patent, and hence is not illustrated or described in detail. As shown, there is a keyway 19 for a key or feather (not shown) to lock the nut 18 to the shaft end 8. The shaft 8 may have a tapped bore 20 in its upper end, to take an eye bolt (not shown) for use in assembling the parts. The upper end of the hub 5 has a dome-like cover 21 suitably secured thereover.

With the construction just described, the weight of the shaft 8, etc., and the downward thrust in crushing pull the nut 18 into the sleeve taper 17, thus contracting the nut on the shaft threads 8 and locking the sleeve and collar, nut, and shaft together as a unitary member. This prevents the sleeve 14 from revolving on the shaft 7. The bearing surfaces at 12 affords ample area for taking the heavy pull involved without overstressing the material of the parts 10 and 15; so, likewise, the shoulder area at 9 and the metal of the hub 5 that sustains the stress on this area. The recess formed in the upper end of the bushing 10 at the bearing seat 12 may be filled with oil for lubricating the bearing surfaces at this point, as shown, and the surface 12 may have radial grooves 22 therein to facilitate the distribution of the oil, and to transmit it to the outer surface of the sleeve 14. The spherical bearing surface 12 is thus wholly immersed in the oil.

In assembling the parts, the shaft 7 is first lowered into the machine (as by an eye-bolt screwed into the tapped hole 20) and allowed to rest on the bottom of the crusher. The spider 4 (with its bushing 10) is then placed in position, and the bearing sleeve 14 is lowered into place in the bushing 10, around the shaft 7. Next the nut 18 is screwed down on the shaft end 8 as far as it will go. The shaft 7 is then lifted (by the eye-bolt already mentioned), and adjusted to the proper height, where it is held suspended while the nut 18 is screwed down tight in its seat 17, and locked (with a key or feather). When, now, the shaft 7 is lowered, its weight comes on the collar 15, and the nut 18 is pulled into the socket 17, and thus contracted on the shaft as already mentioned. The crushing stresses merely augment this action.

If occasion arises for dismantling, the shaft 7 is lifted slightly by the eye-bolt, and the collar 15 (with sleeve 14) released by means of jack-screws 24 through a flange 25 on the upper end of the nut 18. The feather (not shown) may then be removed, and the nut 18 unscrewed and removed. Thereupon the shaft 7 may be lowered to the bottom of the crusher, and the sleeve 14 and spider 4 (with its bushing 10) hoisted out.

The construction shown in Fig. II differs from that of Fig. I in that the shaft sleeve 14a is not integral with the support bearing collar 15a, but entirely separate, being shrunk on the upper end of the shaft 7a. It thus affords a wearing surface renewable independently of the collar 15a. The collar 15a, also, may have a removable wearing ring 26, removable independently of the sleeve 14a. In this Fig. II construction, the bearing device is not in one piece or part as in Fig. I, but has its upper supporting portion 10a separate from the bushing 10 affording the fixed journal surface, and movable relative thereto under certain conditions: i. e., the spherical supporting bearing surface at 12 is on a separate annular bearing "washer" 10a loose in the upper end of the bushing 10, whose cavity has a flat bottom to engage the flat bottom surface of said washer 10a. The washer 10a has radial oil grooves 22a in its lower side, to lubricate its movement. When the inside of the bushing 10 and the outside of the shaft 7 (or its sleeve 14a), have become worn, so that the shaft 7 shifts slightly in the bushing as it gyrates, then the washer 10a can also shift, so as always to take the downward thrust uniformly. Without this, such wear would result in a crowding action on one side of the spherical surface 12, due to the misalignment. In other words, this upper portion 10a of the bearing structure 10 is initially and (so to speak) normally stationary and immovable relative to the rest of said bearing, but can move slightly relative thereto when wear around the shaft 7 makes such movement desirable.

In both constructions, the bushing 10 may be of cast iron, bronze, or other suitable material, and the shaft sleeve 14 of bronze; or the shaft sleeve 14 may be of steel, the removable wearing ring 26 beneath the collar 15a of Fig. II may be of bronze.

Having thus described my invention, I claim:

1. In a gyratory crusher suspension, the combination with a gyratory crusher shaft externally screw-threaded at its upper end, of a surrounding bearing device, for journalling and supporting said gyratory crusher shaft, having a stationary internal journal surface for taking the side thrust of the gyrating shaft, and also having an upper spherical surfaced supporting portion above said journal surface for supporting the shaft; a wearing sleeve removably secured fast on the shaft for coacting with said stationary internal journal surface; an internally tapered spherical bearing collar around the shaft resting on said upper spherical surfaced portion of said bearing device; and a tapered contractile nut screwed on the shaft and fitting in said collar, so as to be squeezed tight on the screw threads by the downward pull of the shaft, and thus holding said spherical bearing collar fixed to the gyratory shaft.

2. In a gyratory crusher suspension, the combination with an externally screw-threaded gyratory crusher shaft of a surrounding stationary supporting bearing also having an internal journal surface for taking the side thrust of the gyrating shaft, a shaft sleeve coacting externally with said journal surface gyrating therein with the shaft and internally tapered at its own upper end, and having an external supporting flange or collar portion resting and gyrating on said supporting bearing above said journal portion of said supporting bearing, and a tapered contractile nut screwed on the shaft and fitting in said collar, so as to be squeezed tight on the screw threads by the downward pull of the shaft, and thus holding said shaft sleeve fixed to the gyratory shaft.

3. In a gyratory crusher suspension, the combination with an externally screw threaded gyratory crusher shaft of a surrounding stationary supporting bearing also having an internal journal surface for taking the side thrust of the gyratory shaft, a spherical surfaced annular bearing self-adjustingly movable on said supporting bearing, an internally tapered spherical bearing collar around the shaft resting on said spherical bearing, and a tapered contractile nut screwed on the shaft and fitting in said collar, so as to be squeezed tight on the screw threads by the downward pull of the shaft, and thus holding said bearing collar fixed to the gyratory shaft.

4. In a gyratory crusher suspension, the combination with an externally screw threaded gyratory crusher shaft of a surrounding stationary supporting bearing also having an internal journal surface for taking the side thrust of the gyratory shaft, a spherical surfaced annular bearing self-adjustingly movable on said supporting bearing, and a spherical bearing collar secured fast to the shaft and resting on said spherical bearing.

5. In a gyratory crusher suspension, the combination with an externally screw-threaded gyratory crusher shaft of a surrounding spherical supporting bearing also having a stationary internal journal surface for taking the side thrust of the gyratory shaft, a shaft sleeve coacting wtih said journal surface internally tapered at its own upper end and having a spherical surfaced external supporting flange or collar portion resting on said spherical bearing above its said stationary journal surface, and a tapered contractile nut screwed on the shaft and fitting in said collar, so as to be squeezed tight on the screw threads by the downward pull of the shaft, and thus holding said bearing collar fixed to the gyratory shaft.

CHARLES H. PATTEN.